United States Patent [19]

Karasaki et al.

[11] Patent Number: 5,037,188
[45] Date of Patent: Aug. 6, 1991

[54] OPTICAL SYSTEM FOR DETECTING FOCUSING CONDITION

[75] Inventors: Toshihiko Karasaki; Kazumi Sugitani, both of Osaka, Japan

[73] Assignee: Minolta Camera Kabushiki Kaisha, Osaka, Japan

[21] Appl. No.: 314,128

[22] Filed: Feb. 23, 1989

[30] Foreign Application Priority Data

Feb. 24, 1988 [JP] Japan .................... 63-43056

[51] Int. Cl.⁵ ............................................. G02B 9/00
[52] U.S. Cl. ................................... 359/619; 359/738
[58] Field of Search ................. 350/167, 448, 449, 450

[56] References Cited

U.S. PATENT DOCUMENTS

| | | | |
|---|---|---|---|
| 3,548,041 | 12/1970 | Stading | 350/167 |
| 4,526,458 | 7/1985 | Kawamura et al. | 354/406 |
| 4,699,493 | 10/1987 | Koyama et al. | 354/406 |
| 4,808,806 | 2/1989 | Shindo et al. | 250/201 |

FOREIGN PATENT DOCUMENTS 61-294814 12/1986 Japan .
62-78518 4/1987 Japan .
62-79407 4/1987 Japan .
63-11906 1/1989 Japan .

OTHER PUBLICATIONS

T. Karasaki, "AF Sensor Module", Minolta Techno Report, pp. 40–42 (1986).

Primary Examiner—Scott J. Sugarman
Attorney, Agent, or Firm—Burns, Doane, Swecker & Mathis

[57] ABSTRACT

An optical system for detecting focusing condition comprises a pair of image re-forming lenses and an aperture mask. The image re-forming lenses are configured with a pair of plano-convex lenses having equal radius of curvature R and an equal axial thickness T. R is nearly equal to T ($R \approx T$). The aperture mask has apertures corresponding to the respective plano-convex lenses and is attached closely to the flat surfaces of the plano-convex lenses. Comatic aberrations for the respective light fluxes passing through the apertures become nearly same, and therefore point images formed by the respective light fluxes also become nearly same. Consequently, high accuracy of focusing condition detection is established.

11 Claims, 10 Drawing Sheets

OPTICAL SYSTEM FOR DETECTING FOCUSING CONDITION

BACKGROUND OF THE INVENTION

1. Field of the Invention

The present invention relates to an optical system for detecting focusing condition of a camera, and specifically relates to such optical system to be usable for an autofocus apparatus for single-lens reflex cameras and video cameras.

2. Description of the Prior Art

Recently, various kinds of optical systems for focus detection by a phase difference method which are used for cameras with auto-focusing function and the like have been suggested. According to the phase difference method, detection of focusing condition is established by detecting the relative positions of a plurality of re-formed images.

FIG. 5 shows a schematic configuration of a conventional optical system for detecting focusing condition by phase difference method. In this optical system, an aperture mask $A_M$, a pair of image reforming lenses $L_1$ and $L_2$, and a line sensor $P_0$ are disposed in sequence behind a condenser lens $L_0$. A pair of those image re-forming lenses $L_1$ and $L_2$ are disposed nearly symmetrically with respect to an optical axis $l_0$ (hereinafter referred to as a principal optical axis) of a taking lens, and re-form an image formed by the taking lens as a first image and a second image in cooperation with the condenser lens $L_0$. Here, the distance between the first image and the second image which are re-formed by the image re-forming lenses $L_1$ and $L_2$ is varied depending on the focusing condition of the taking lens. A first and a second photo-detector arrays I and II of the line sensor $P_0$ are disposed respectively in one line at or in the vicinity of a position which is conjugate with a predetermined image forming plane FP of the taking lens with respect to the condenser lens $L_0$ and a pair of the image re-forming lenses $L_1$ and $L_2$. The focusing condition of the taking lens can be detected by detecting the positions of the first image and the second image on the first and the second photo-detector arrays I and II.

In FIG. 5, assuming that the magnification of image of the optical system is constant, a length S of the focusing condition detecting area on the predetermined image forming plane FP of the taking lens is determined by lengths $S_I$ and $S_{II}$ of the first and the second photo-detector arrays I and II of the line sensor $P_0$. Accordingly, in order to lengthen the length S of the focusing condition detecting area, the lengths $S_I$ and $S_{II}$ of the first and the second photo-detector arrays I and II are required to be extended.

FIG. 7 is a schematic configuration view of an optical system for detecting focusing condition in the case where the length S of the focusing condition detecting area is lengthened. In accordance with elongation of the lengths $S_I$ and $S_{II}$ of the first and the second photo-detector arrays I and II, the distance between the first image and the second image to be re-formed is required to be extended. In the optical system shown in FIG. 7, by extending an distance l between centers $O_1$ and $O_2$ of curvature of a pair of the image re-forming lenses $L_1$ and $L_2$ in comparison with the optical system shown in FIG. 5, the optical path for forming the first image and the second image is deflected from the optical path as shown by broken lines to the optical path as shown by alternate long and two short dashes lines and thereby the distance between the first image and the second image is extended. Here, the distance between a pair of diaphragm apertures $A_1$ and $A_2$ can also be extended in addition to that between centers $O_1$ and $O_2$ of curvature, but the light flux for detecting the focusing condition becomes easy to be eclipsed, and the F number of the interchangeable lens capable of detecting the focusing condition is limited, and therefore, here, the distance between the image re-forming lenses $L_1$ and $L_2$ is extended from the distance as shown in FIG. 5 to that as shown in FIG. 7 in relation to the diaphragm apertures $A_1$ and $A_2$, and thereby the distance between the first image and the second image is extended.

In the Japanese Laid-Open Patent Publication No. 78518/1987, it is proposed that a reflecting member having at least two reflecting mirrors is disposed behind each image re-forming lens, and thereby the first image and the second image are separated in the direction of disposition of the photo-detector arrays. However, such disposition of the reflecting member for each image re-forming lens results in raising a problem that the configuration is complicated and the size becomes larger. It is therefore preferable that the focusing condition detecting apparatus for a camera required to be smaller in size utilizes the eccentricity of the image re-forming lenses.

However, where the extension of the focusing condition detecting area is established by the eccentricity of the image re-forming lenses $L_1$ and $L_2$, a problem exists that the field curvatures of the first image and the second image to be re-formed appear greatly, and the magnitudes of point images on the photo-detector arrays I and II becomes asymmetric with respect to center points of the photo-detector arrays I and II, respectively, resulting in a focusing condition detection error.

FIG. 6 and FIG. 8 show the magnitudes of the point images on the photo-detector arrays I and II shown in FIG. 5 and FIG. 7, respectively. As shown in FIG. 5, in the case where the distance l between the center axes $l_1$ and $l_2$ of curvature of the image re-forming lenses $L_1$ and $L_2$ is determined so that light flux from an intersection point C of the predetermined image forming plane FP and principal optical axis $l_0$ travels nearly straight and the image of the point C is re-formed at center points $C_I$ and $C_{II}$ of the first and the second photo-detector arrays I and II, respectively, as shown in FIG. 6, no significant difference is produced between the magnitudes of point images of end points A and B of the focusing condition detecting area which are re-formed at end points $A_I$, $A_{II}$ and $B_I$, $B_{II}$ on the photo-detector arrays I and II, respectively.

On the other hand, as shown in FIG. 7, in the case where the distance l between the centers of curvature of the image re-forming lenses $L_1$ and $L_2$ is extended so that light flux from the intersection point C is deflected by the image re-forming lenses $L_1$ and $L_2$ and the image of the point C is re-formed at the center points $C_I$ and $C_{II}$ of the photo-detector arrays I and II, respectively, the light flux incident on the photo-detector array I from, for example, a point A in the focusing condition detecting area is not deflected so much when passing through the image re-forming lens $L_1$, but it is deflected considerably when passing through the image re-forming lens $L_2$, and therefore it is focused before the point where the light flux passing through the image re-forming lens $L_1$ is focused, due to an influence of comatic aberration. This means that the point image re-formed at the end point $A_{II}$ of the photo-detector array II becomes larger than the point image re-formed at the end point $A_I$ of the photo-detector array I. Accordingly, as shown in FIG. 8, a significant difference is produced between the magnitudes of the point images of the end points A and B of the focusing condition detecting area which are re-formed at the end points $A_I$, $A_{II}$ and $B_I$, $B_{II}$, respectively of the photo-detector arrays I and II, and magnitudes of the point images on the photo-detector arrays I and II are asymmetric with respect to the center points $C_I$ and $C_{II}$, respectively. Then, this causes a detection error of focusing condition.

FIG. 10 shows outputs of the photo-detector arrays I and II when a subject of white stripes on a black ground is put so that, as shown in FIG. 9, a white stripe (a) comes near the end point A of the focusing condition detecting area $F_4$, a white stripe (b) comes near the end point B and a white stripe (c) comes in the vicinity of the center point C, respectively. In this case, widths of the images of the stripe (c) which are respectively re-formed in the vicinity of the center points $C_I$ and $C_{II}$ of the photo-detector arrays I and II are same, but widths of the images of the stripe (a) which are respectively re-formed in the vicinity of end points $A_I$ and $A_{II}$ are different, and widths of the images of the stripe (b) which are respectively re-formed in the vicinity of end points $B_I$ and $B_{II}$ are also different. Thus, when the magnitudes of the point images at the corresponding view points of the photo-detector arrays I and II differ remarkably, the degree of identity of the first image and the second image is reduced, resulting in a deterioration of accuracy in focusing condition detection. Furthermore, this phenomenon becomes greater as the image point shifts farther from the principal optical axis $l_0$, and therefore, the merit of extending the focusing condition detecting area cannot be fully obtained.

In addition, in the Japanese Laid-Open Patent Publication No. 79407/1987, reference is made on the conditions of the thickness of the image re-forming lens, but it does not disclose the conditions for correcting the magnitudes of the point images to be re-formed, and the configuration of the image re-forming lens shown in this prior art is a combination of a prism surface and a convex lens surface, and therefore this does not serve to solve the above-described technical problem.

SUMMARY OF THE INVENTION

A principal object of the present invention is to prevent in an optical system for detecting focusing condition by phase difference method a deterioration of accuracy in focusing condition detection caused by curvature of field, which is produced in accordance with extension of a focusing condition detecting area by means of eccentricity of image re-forming lenses.

In accordance with the present invention, an image of an object formed by the taking lens is re-formed as a pair of images on photo-detector arrays, for example, charge coupled device (hereinafter referred to as "CCD") line sensors arranged in one line through a condenser lens, a pair of image re-forming lenses and an aperture mask having a pair of diaphragm apertures which are eccentric with respect to the respective centers of curvature of the image re-forming lenses, and the positions of a pair of images re-formed on the above-mentioned photo-detector arrays are detected. The above-mentioned image re-forming lenses comprise a pair of plano-convex lenses having the same radius of curvature R and the same axial thickness T and further fulfills a condition of $R \approx T$ (that is, R is nearly equal to T), and the aforesaid aperture mask has diaphragm apertures corresponding to the respective plano-convex lenses and is attached closely to the flat surfaces of the above-mentioned plano-convex lenses.

In the present invention, as described above, the radius of curvature R and the axial thickness T of each of the plano-convex lenses composing the image re-forming lens are made nearly equal, and the aperture mask is attached closely to the flat surfaces of the plano-convex lenses, and therefore the centers of curvature of the plano-convex lenses can be positioned nearly on the aperture mask. This means that, in the present invention, the centers of curvature of the image re-forming lenses are allowed to deviate from the aperture center lines of the corresponding diaphragm apertures, respectively, but the centers of curvature of the image re-forming lenses are not allowed to deviate greatly from the plane containing the diaphragm apertures (plane of aperture mask). Accordingly, comatic aberrations for the light fluxes incident from the directions symmetric with respect to the aperture center line of the diaphragm aperture become nearly the same, and thereby the magnitudes of the point images with respect to the respective light flux also become nearly the same. This means that, as long as the magnitude of the point image is concerned, the same phenomenon is produced as in the case where the centers of curvature of image re-forming lenses are not eccentric with respect to the aperture center lines of the corresponding diaphragm apertures, respectively. Accordingly, it is possible to prevent a deterioration of accuracy in focusing condition detection caused by the eccentricity of the image re-forming lenses $L_1$ and $L_2$.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE PREFERRED EMBODIMENT

Figure 1A:
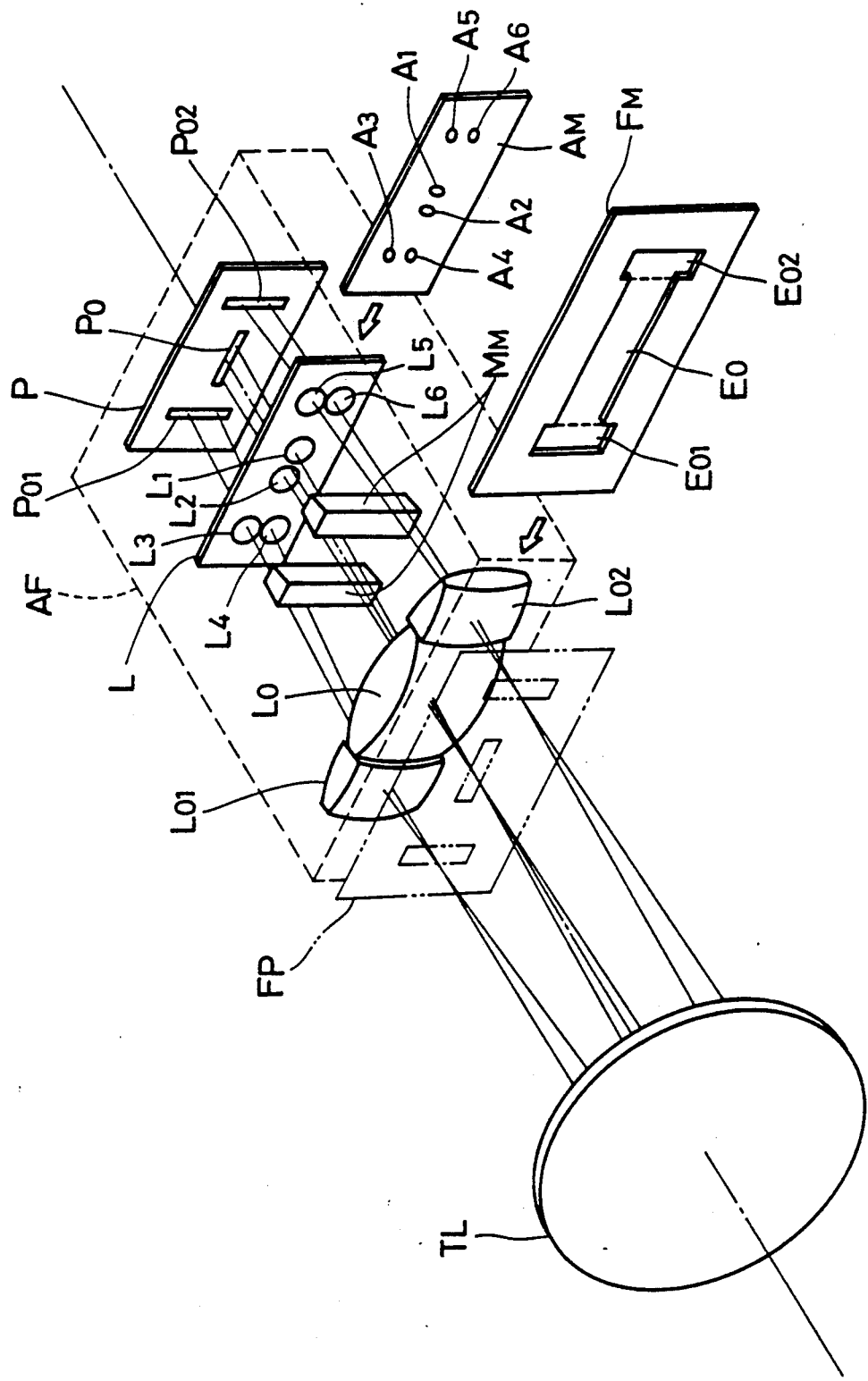
FIG. 1(a) is a perspective view showing a schematic configuration of one embodiment of an optical system for detecting focusing condition in accordance with the present invention.
Figure 1:
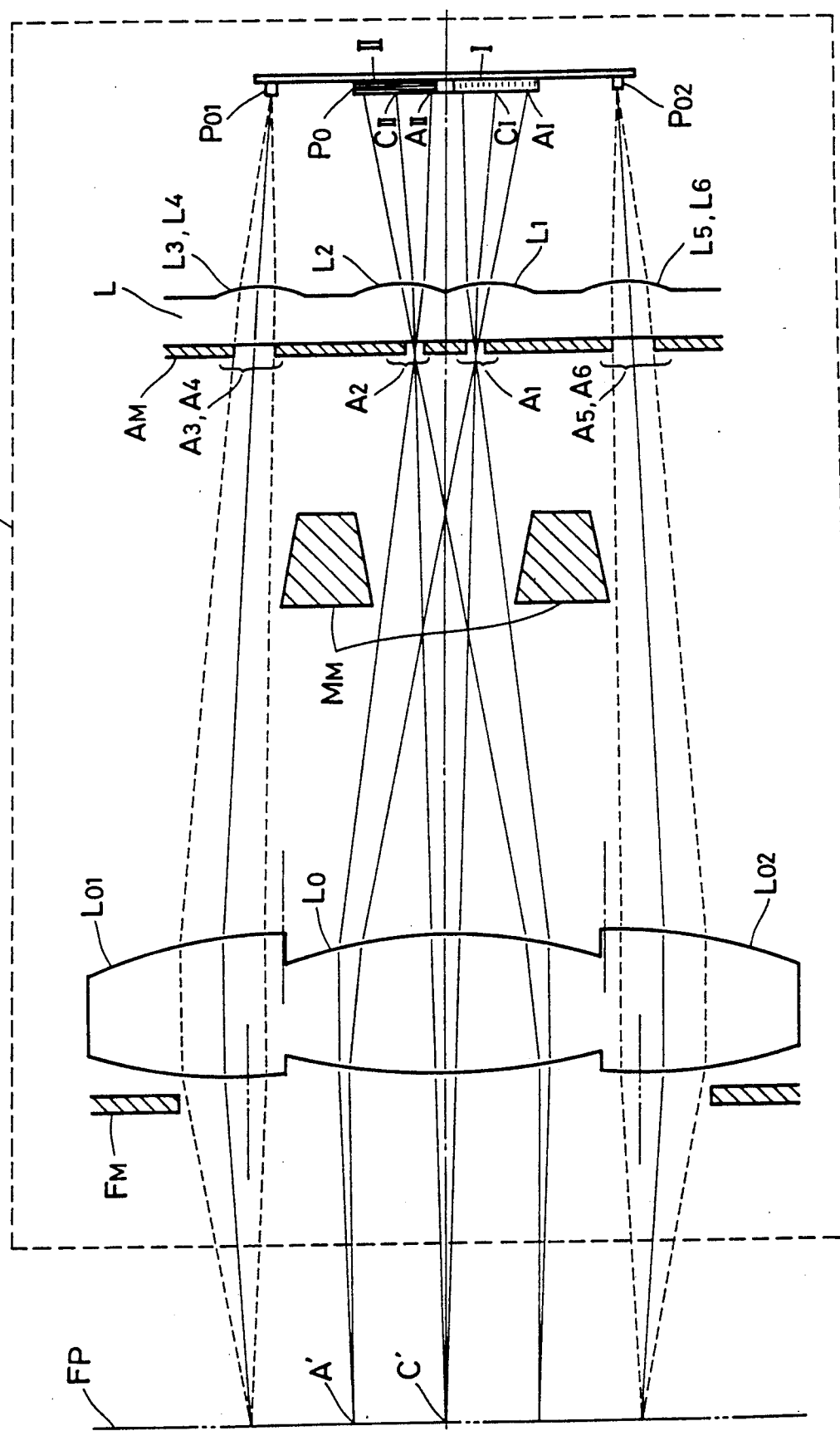
FIG. 1(b) is a plan view of a schematic configuration shown in FIG. 1(a).

FIG. 1(a) is a perspective view showing a schematic configuration of one embodiment of an optical system for detecting focusing condition constructed in accordance with the present invention, and FIG. 1(b) is a plan view of the same. In FIG. 1(a), a field mask $F_M$ is disposed in the vicinity of an predetermined image forming plane FP of a taking lens TL. An aperture $E_0$ is formed at the center part of the above-mentioned field mask $F_M$, and apertures $E_{01}$ and $E_{02}$ are formed on the both sides thereof, and they configure a H-shaped aperture as a whole. Light fluxes passing through the respective apertures $E_0$, $E_{01}$ and $E_{02}$ of the field mask $F_M$ pass through condenser lenses Lhd 0, $L_{01}$ and Lhd 02 to be converged. An image re-forming lens plate L is provided with a pair of image re-forming lenses $L_1$ and $L_2$ which are disposed at the center part in the lateral direction and pairs of image re-forming lenses $L_3$, $L_4$ and $L_5$, $L_6$ disposed respectively on the both sides in the longitudinal direction. All of the image re-forming lenses $L_1$ to $L_6$ consist of plano-convex lenses having the same radius of curvature and the same axial thickness, and the convex surfaces thereof are directed to the side of a sensor substrate P. Diaphragm apertures $A_1$ to $A_6$ are formed at the positions corresponding to the image re-forming lenses $L_1$ to $L_6$, respectively in an aperture mask $A_M$. This aperture mask $A_M$ is disposed immediately before the image re-forming lens plate L, being attached closely to the flat part of the image re-forming lens plate L. A light-shielding member $M_M$ for optically separating a focusing condition detecting block on the principal optical axis and a focusing condition detecting block off the principal optical axis from each other is disposed between the condenser lenses $L_0$, $L_{01}$ and $L_{02}$ and the image re-forming lens plate L to prevent an intrusion of stray light.

At the center part of the sensor substrate P, a CCD line sensor $P_0$ is disposed laterally so as to correspond to the direction of disposition of a pair of the image re-forming lenses $L_1$ and $L_2$. Also, on the both sides of the sensor substrate P, CCD line sensors $P_{01}$ and $P_{02}$ are disposed longitudinally so as to correspond to the direction of disposition of pairs of the image re-forming lenses $L_3$, $L_4$ and $L_5$, $L_6$, respectively. Each of the CCD line sensors $P_0$, $P_{01}$ and $P_{02}$ comprises a first and a second photo-detector arrays, and separately performs photo-electric conversion of the first image and the second image which are re-formed by each of pairs of the image re-forming lenses $L_1$, $L_2$; $L_3$, $L_4$; $L_5$, $L_6$. In FIG. 1(a), a block AF encompassed by dotted lines shows an AF sensor module.

Figure 2A:
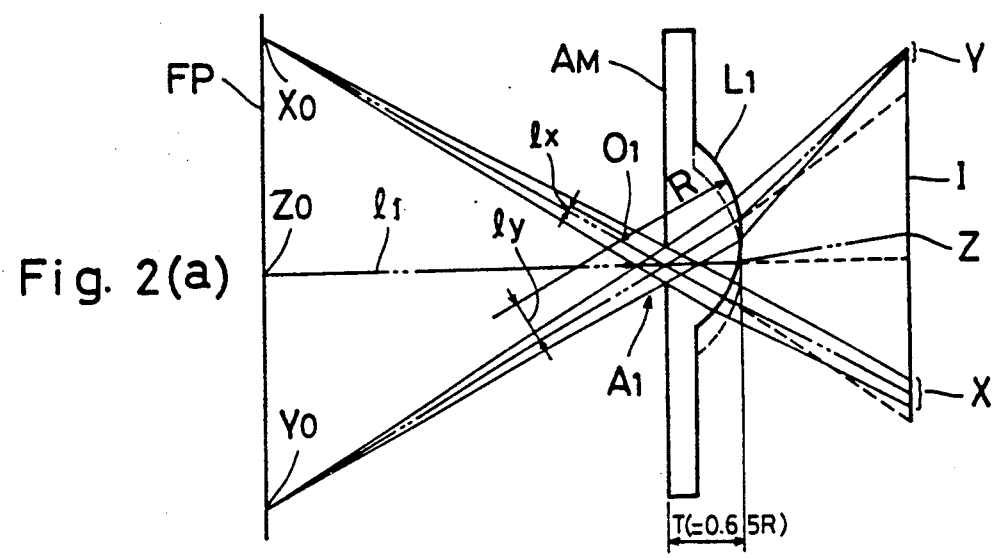
FIG. 2(a) is an explanatory view showing the magnitudes of point images on a photo-detector array in the case where the axial thickness of an image re-forming lens is smaller in comparison with the radius of curvature thereof.
Figure 2B:
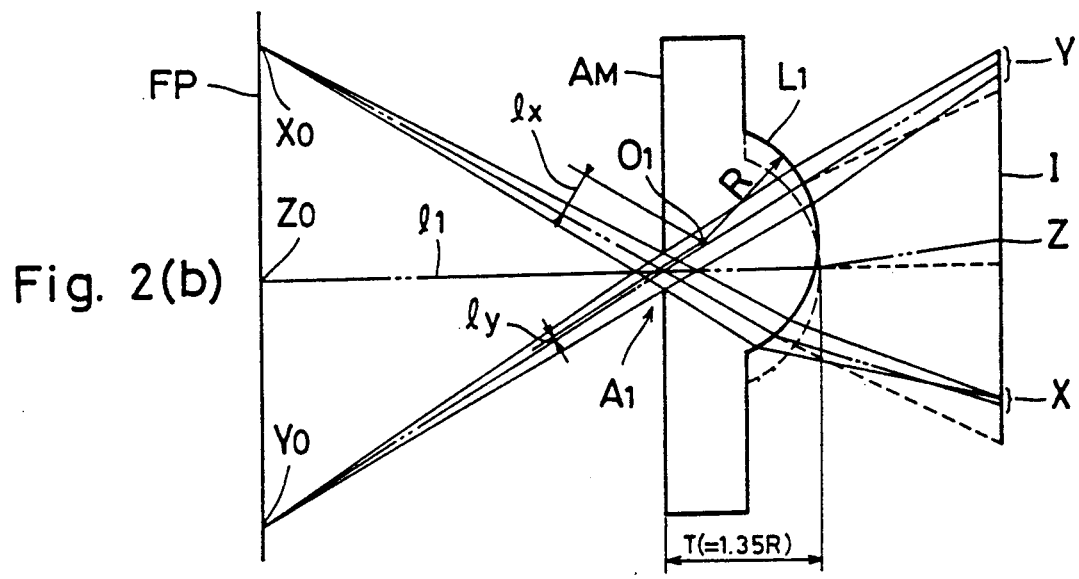
FIG. 2(b) is an explanatory view showing the magnitudes of point images on the photo-detector array in the case where the axial thickness of the image re-forming lens is larger in comparison with the radius of curvature thereof.
Figure 2C:
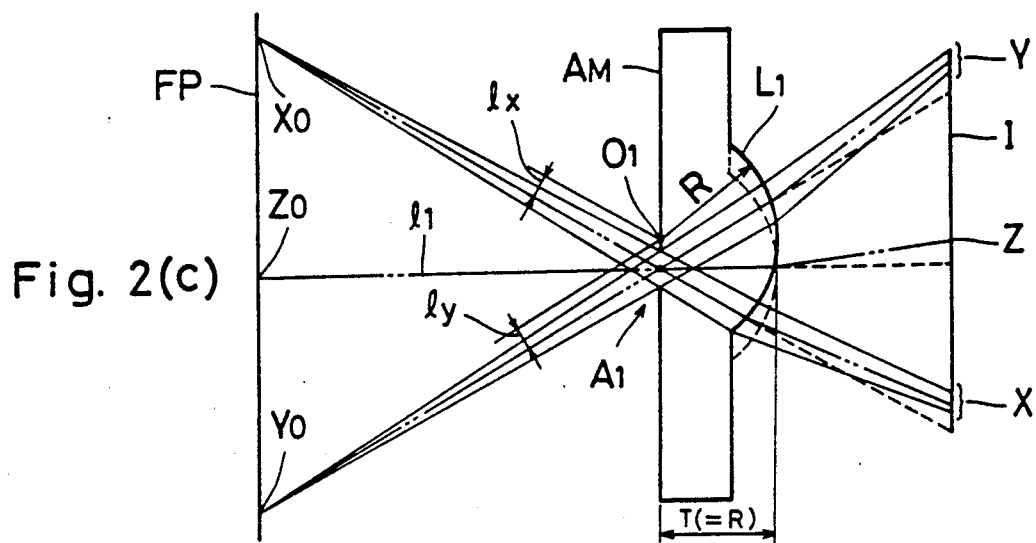
FIG. 2(c) is an explanatory view showing the magnitudes of point images on the photo-detector array in the case where the axial thickness of the image re-forming lens is nearly equal to the radius of curvature thereof.

FIGS. 2(a), 2(b) and 2(c) are drawings for explaining relationship between change in the magnitude of point images on the photo-detector array I and change in the axial thickness T of the image re-forming lens $L_1$. It is assumed that a center $O_1$ of curvature of the image re-forming lens $L_1$ is eccentric with respect to an aperture center line $l_1$ of the diaphragm aperture $A_1$ and the amount of eccentricity thereof is the same in FIGS. 2(a) to 2(c).

First, as shown in FIG. 2(a), in the case where the axial thickness T of the image re-forming lens $L_1$ is smaller in comparison with the radius of curvature R thereof, and the image re-forming lens $L_1$ is eccentric upward, the distance $l_x$ between the principal rays of the light flux incident on the aperture mask $A_M$ from the image point $X_0$ and the center $O_1$ of curvature of the image re-forming lens $L_1$ is shorter than the distance $l_y$ between the principal rays of the light flux incident on the aperture mask $A_M$ from an image point $Y_0$ positioned in symmetry with the image point $X_0$ with respect to the aperture center line $l_1$ and the center $O_1$ of curvature of the image re-forming lens $L_1$. Consequently, the light flux from the image point $Y_0$ has a larger angle of incidence into the spherical surface, and is affected intensely by comatic aberration, and therefore a point image Y becomes smaller in comparison with a point image X on the photo-detector array I.

Next, as shown in FIG. 2(b), in the case where the axial thickness T of the image re-forming lens $L_1$ is larger in comparison with the radius of curvature R, the distance $l_x$ becomes longer than the distance $l_y$, and therefore the light flux from the image point $X_0$ has a larger angle of incidence into the spherical surface, and is affected intensely by comatic aberration, so that the point image X becomes smaller in comparison with the point image Y on the photo-detector array I.

This means that, as shown in FIGS. 2(a) and 2(b), in the case where the axial thickness T of the image re-forming lens $L_1$ is considerably larger or smaller than the radius of curvature R, the point images X and Y on the photo-detector array I becomes asymmetric with respect to a position of incidence Z of the light flux incident from a point $Z_0$ on the predetermined image forming plane FP into the photo-detector array I. The asymmetry causes a deterioration of accuracy in focusing condition detection.

Figure 5:
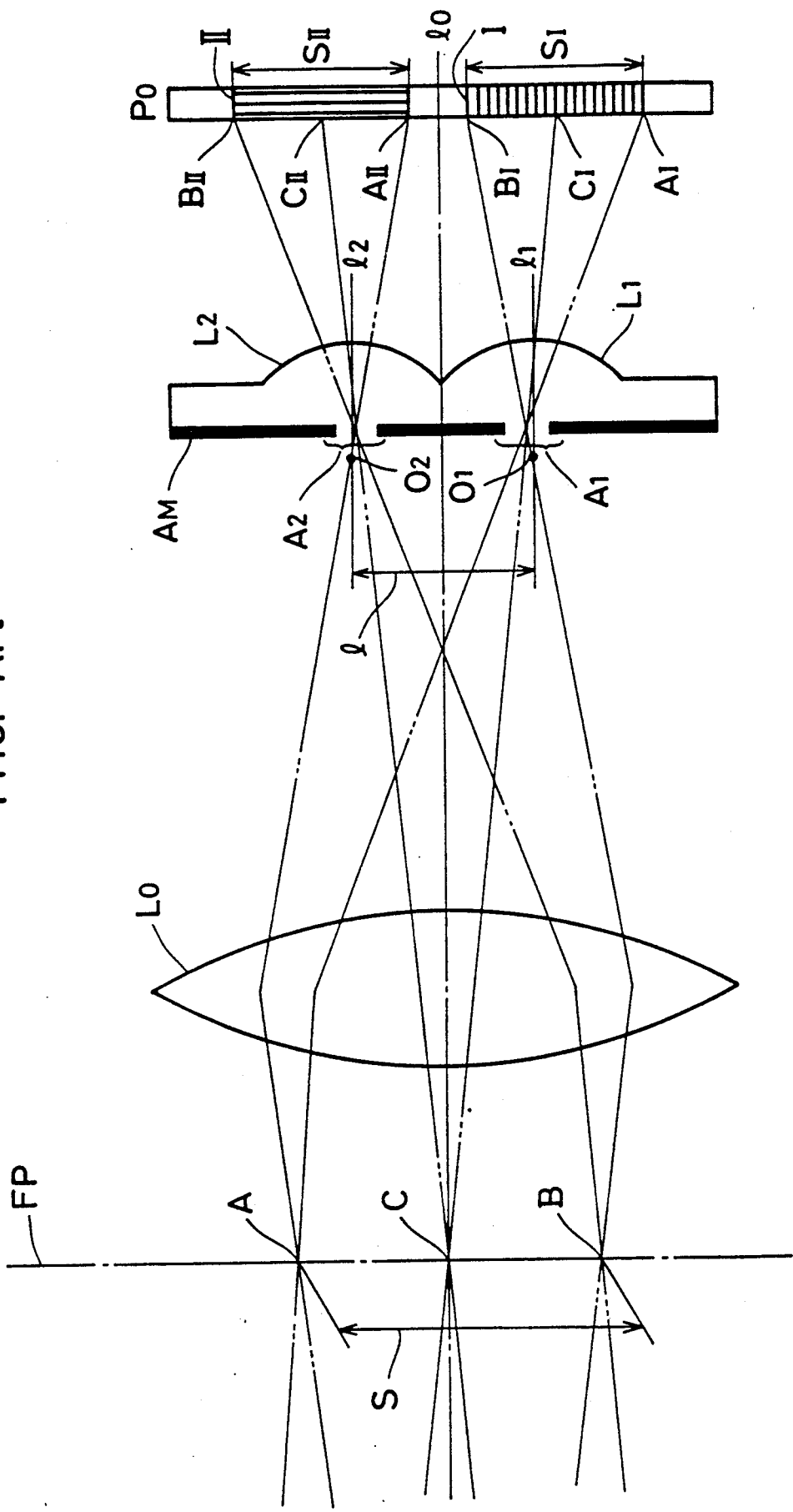
FIG. 5 is a schematic configuration view of a conventional optical system for detecting focusing condition.
Figure 6:
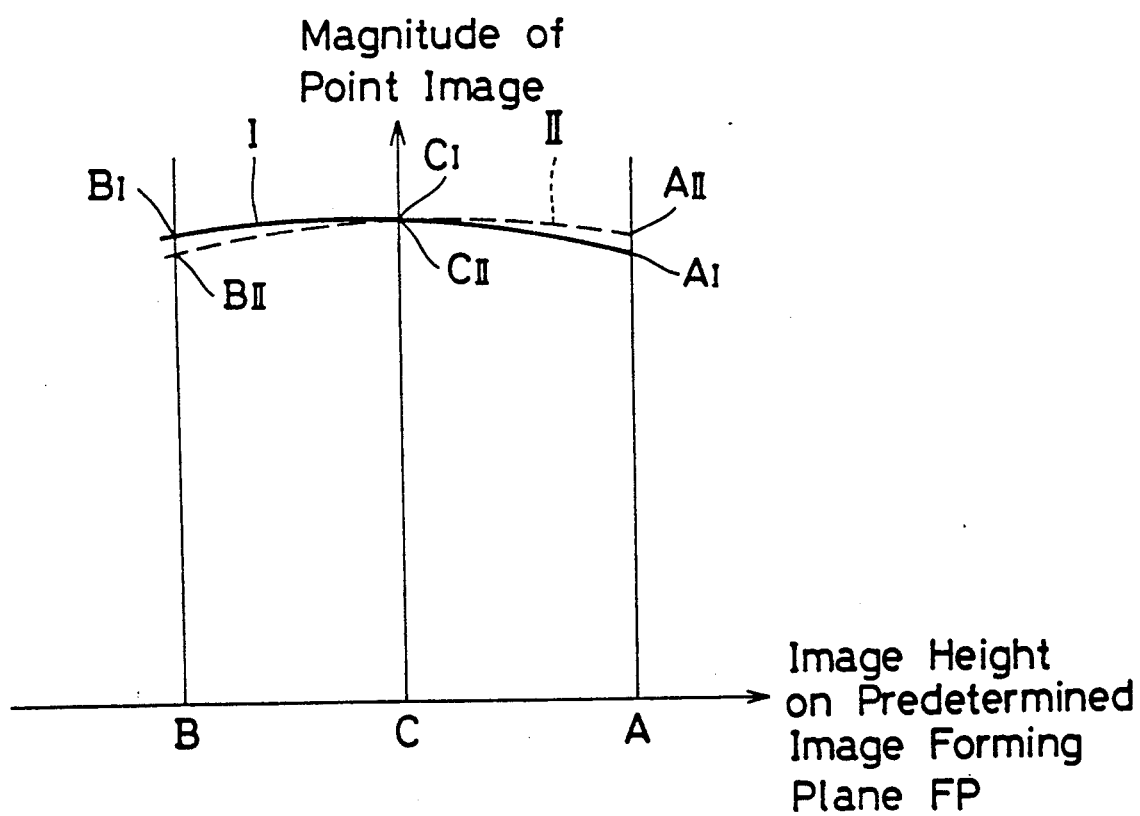
FIG. 6 is an explanatory view showing the magnitudes of point images on the photo-detector arrays shown in FIG. 5.
Figure 7:
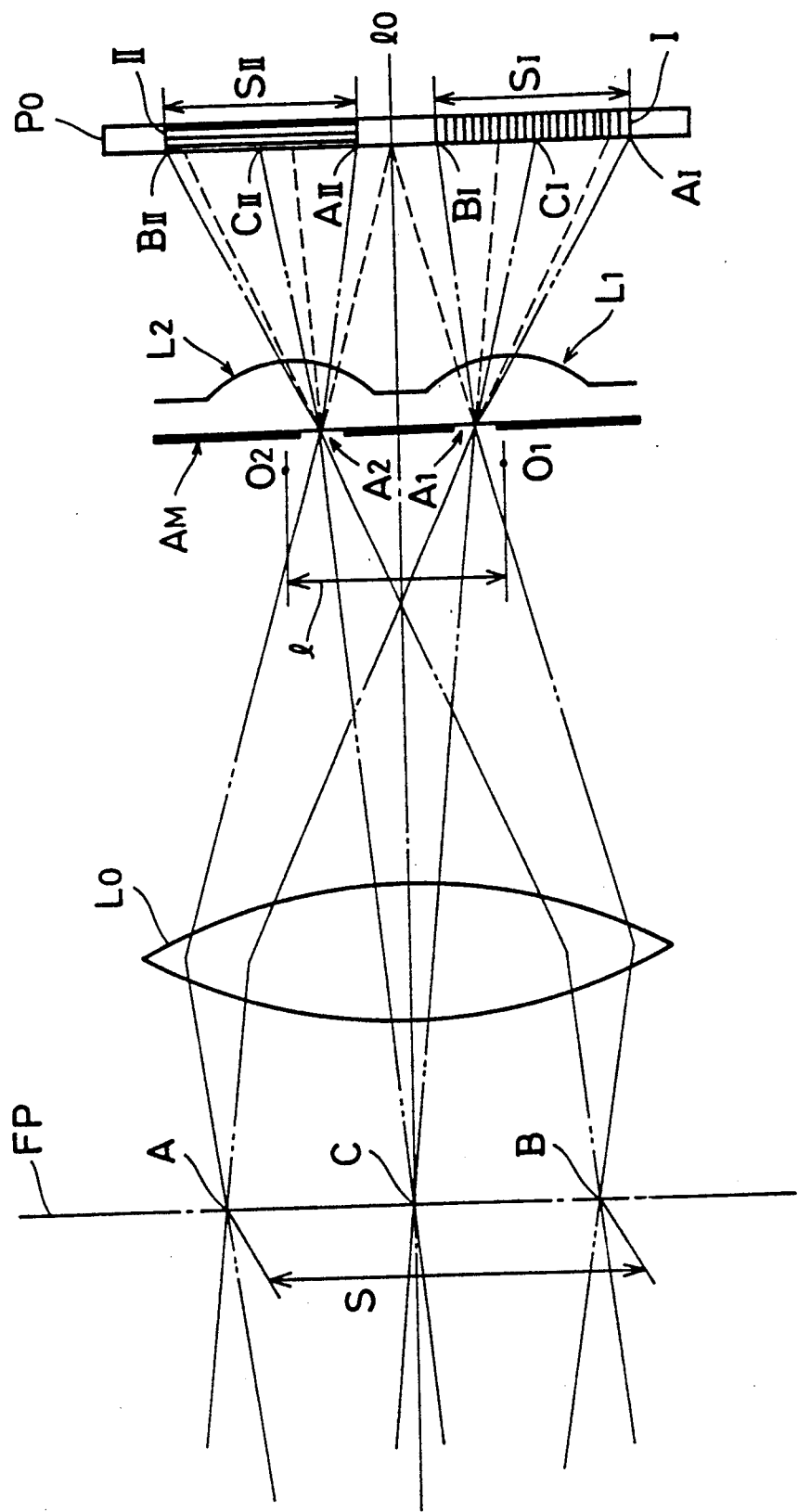
FIG. 7 is a schematic configuration view of another conventional optical system for detecting focusing condition.
Figure 8:
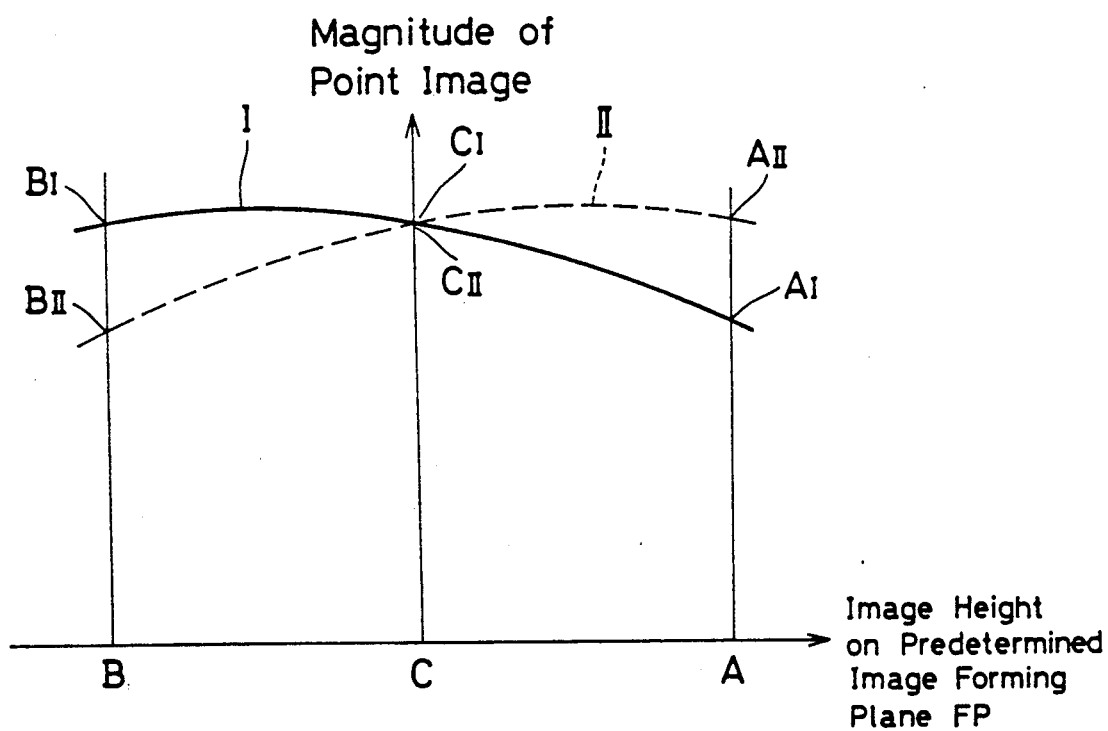
FIG. 8 is an explanatory view showing the magnitudes of point images on the photo-detector arrays shown in FIG. 7.
Figure 9:
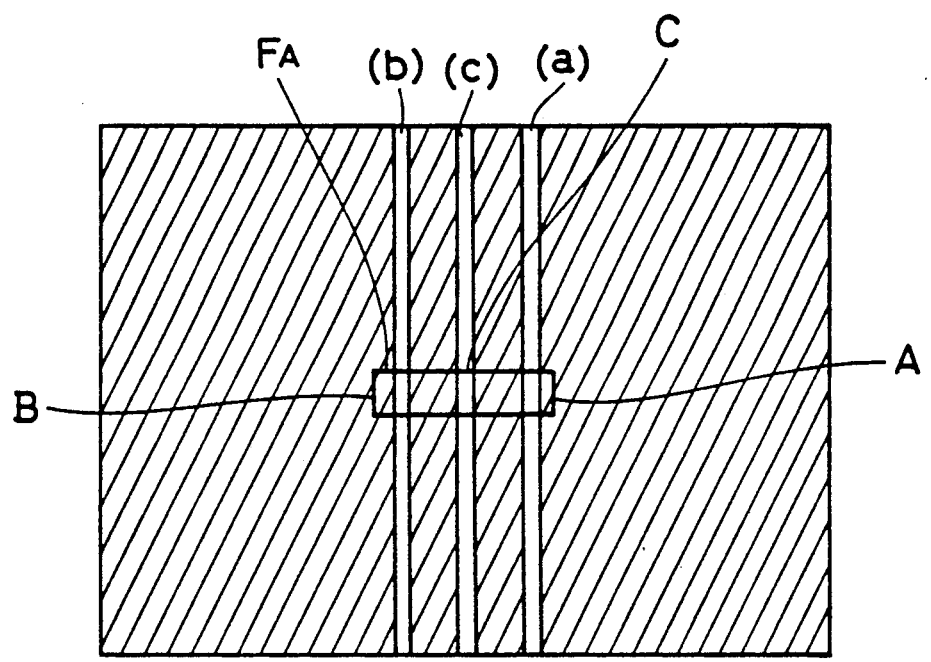
FIG. 9 is an explanatory view giving an example of a subject whose focusing condition is detected by the optical system shown in FIG. 7.
Figure 10:
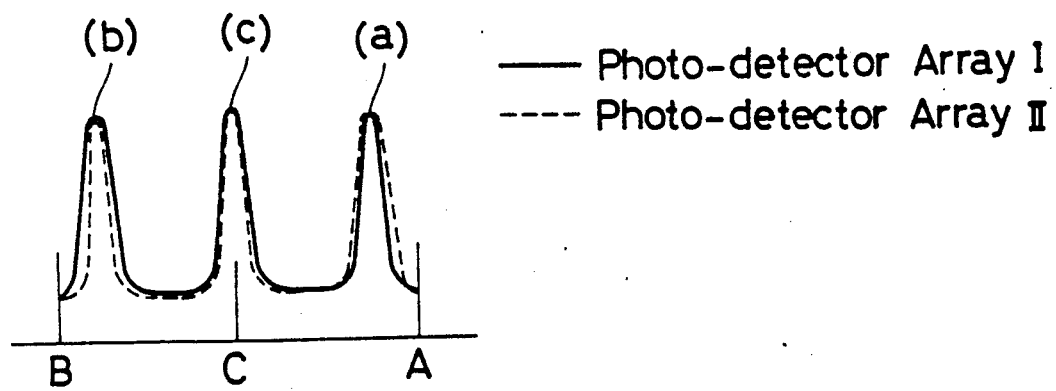
FIG. 10 is an explanatory view showing images re-formed on the photo-detector arrays by the optical system shown in FIG. 7 of the subject illustrated in FIG. 9.

On the other hand, as shown in FIG. 2(c), in the case where the axial thickness T of the image re-forming lens $L_1$ is nearly equal to the radius of curvature R, the distance $l_x$ and the distance $l_y$ become nearly equal. In this case, both the light flux from the image point $X_0$ and the light flux from the image point $Y_0$ are affected by comatic aberration to nearly the same extent, and therefore the point image X and the point image Y on the photo-detector array I become nearly the same in magnitude. This means that the magnitudes of the point images on the photo-detector array I become nearly symmetric with respect to the position of incidence Z of the light flux along the aperture center line $l_1$ of the diaphragm aperture $A_1$. As long as the magnitude of the point image is concerned, it can be said that the same phenomenon is produced as in the case with the optical system for detecting focusing condition as shown in FIG. 5 where the center $0_1$ of curvature of the image re-forming lens $L_1$ is not eccentric with respect to the aperture center line $l_1$ of the diaphragm aperture $A_1$. Accordingly, the present invention can prevent a deterioration of accuracy in focusing condition detection caused by eccentricity of the center $0_1$ of curvature of the image re-forming lens $L_1$.

The above description is made on only the image re-forming forming lens $L_1$, but needless to say, similar theory holds good also on the other image re-forming lens $L_2$.

Figure 3:
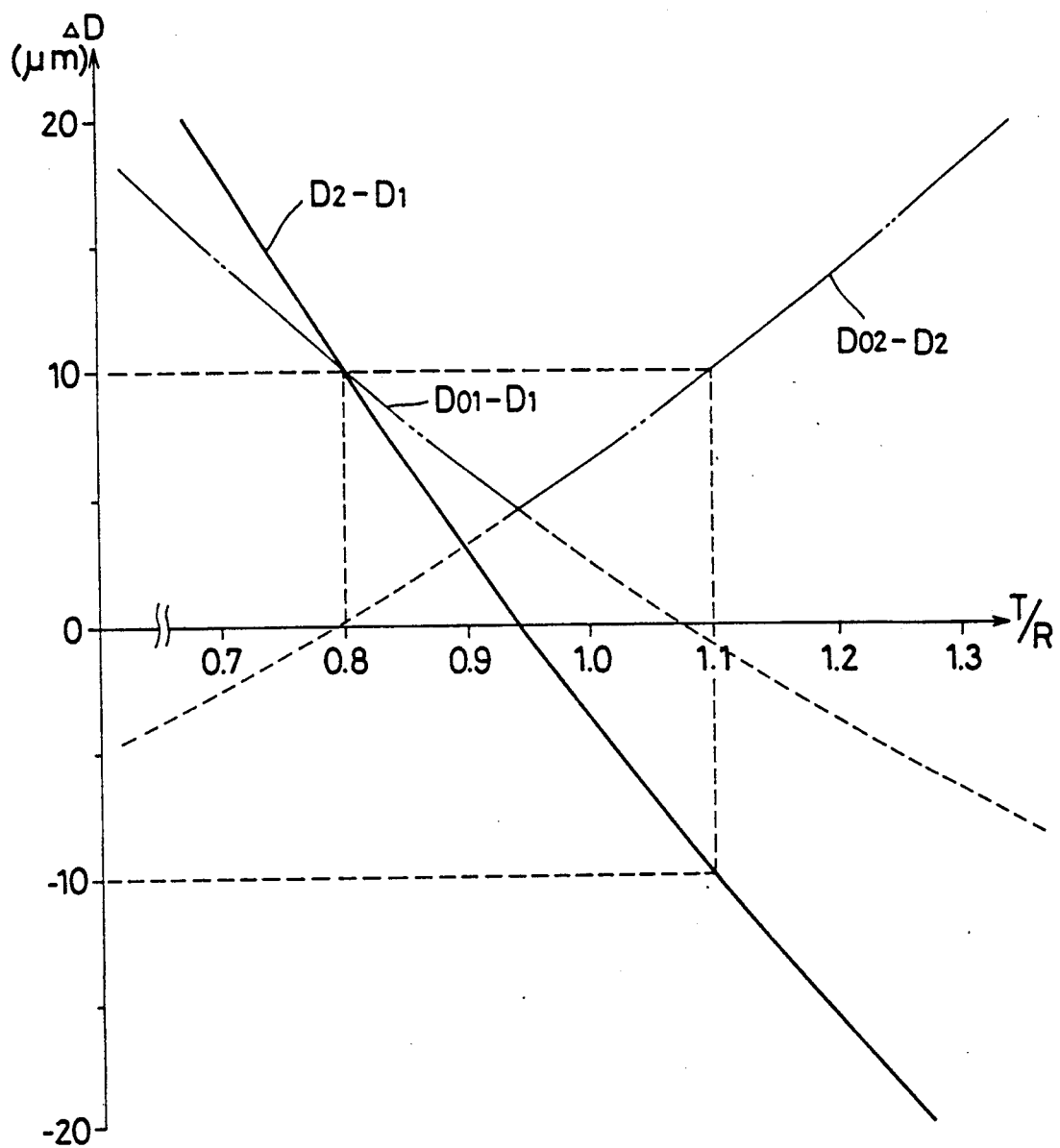
FIG. 3 is a graph showing the change of the difference in magnitude between the point images on the photo-detector arrays when the axial thickness of the image re-forming lenses is varied.

FIG. 3 is a graph showing an aspect of change $\Delta D$ ($\mu m$) of the difference in magnitude between the point images produced at the end points $A_I$ and $A_{II}$ and the center points $C_I$ and $C_{II}$ on the photo-detector arrays I and II when the axial thickness T of the image re-forming lenses $L_1$ and $L_2$ is varied in the optical system for detecting focusing condition shown in FIGS. 1(a) and 1(b). Here, the radius of curvature R of the image re-forming lenses $L_1$ and $L_2$ is set to 1.95mm, the refractive index N of the image re-forming lens plate L is set to 1.4014, and the distance between the aperture centers of the aperture mask $A_M$ is set to 1.12mm. In the graph of FIG. 3, $D_1$ represents the magnitude of the point image produced at the end point $A_I$, $D_2$ represents the magnitude of the point image produced at the end point $A_{II}$, $D_{01}$ represents the magnitude of the point image produced at the center point $C_I$, and $D_{02}$ represents the magnitude of the point image produced at the center point $C_{II}$. As is understood from FIG. 3, $D_2 - D_1 = 0$ holds in the vicinity of $T/R = 0.94$, and therefore the magnitude $D_1$ of the point image produced at the end point $A_I$ and the magnitude $D_2$ of the point image produced at the end point $A_{II}$ become equal, and the magnitudes of the point images on the photo-detector arrays, I and II become symmetric with respect to the center points $C_I$ and $C_{II}$, respectively. Also, in a range of $0.8 \leq T/R \leq 1.1$, the difference $(d_2 - D_1)$ between the magnitudes of the point images at the end points $A_I$ and $A_{II}$ of the focusing condition detecting area falls within 10 $\mu m$, and is about one-seventh of the magnitude of the point image (about 70 $\mu m$), therefore having no significant effect on the accuracy in focusing condition detection.

Figure 4:
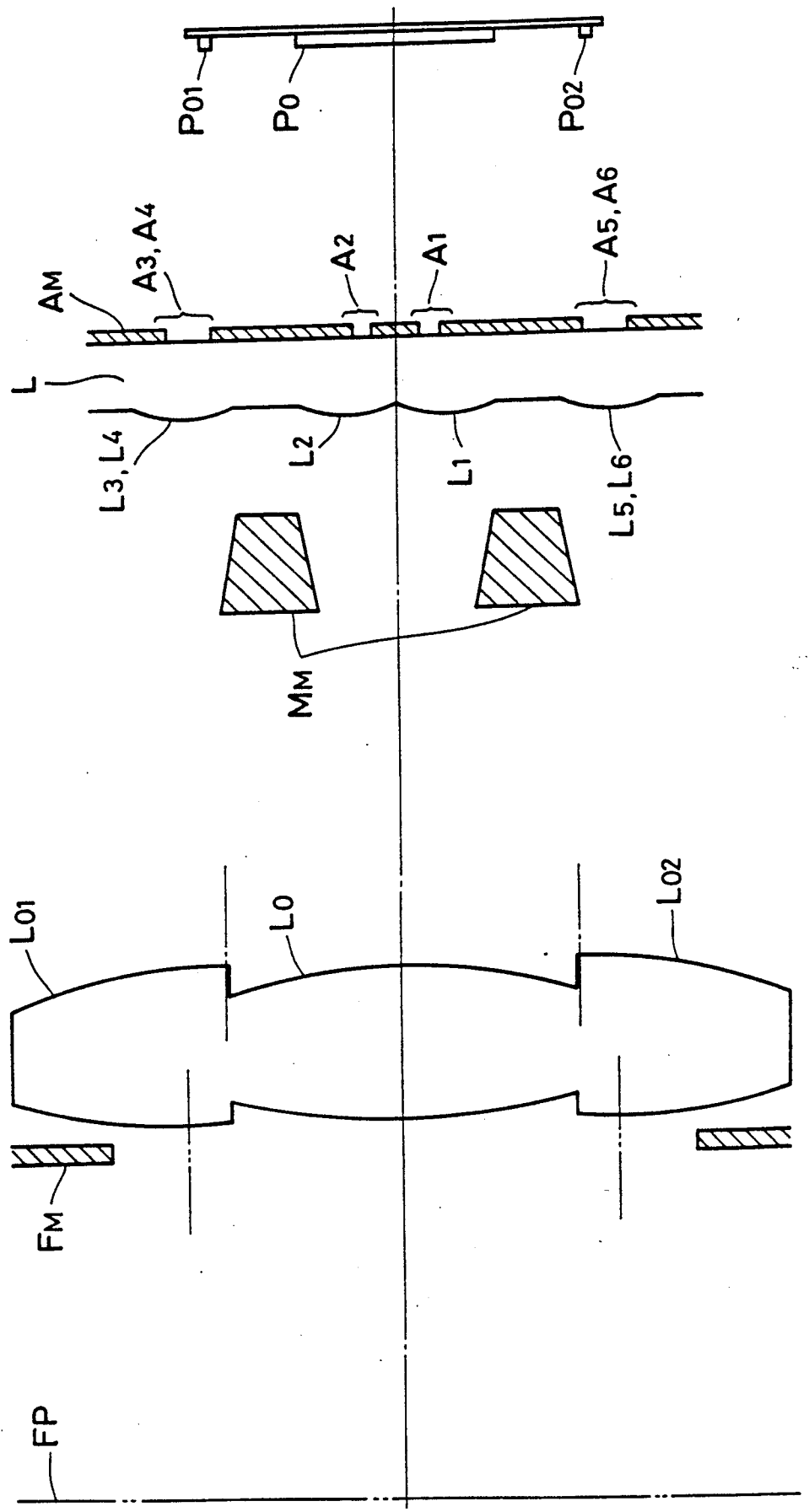
FIG. 4 is a plan view showing a schematic configuration of another embodiment of an optical system for detecting focusing condition in accordance with the present invention.

FIG. 4 is a plan view showing a schematic configuration of another embodiment of the optical system for detecting focusing condition in accordance with the present invention. In this embodiment, the flat surfaces of the images re-forming lenses $L_1$ to $L_6$ consisting of a plano-convex lenses face the sensor substrate P, and the aperture mask $A_M$ is disposed between the image re-forming lens plate L and the line sensors $P_0$, $P_{01}$ and $P_{02}$. The other configurations are similar to the embodiment shown in FIGS. 1(a) and 1(b).

In addition, the above described embodiments are embodiments for the so-called multi-point optical system for detecting focusing condition which has photo-detector arrays in the horizontal direction at the center part and also in the vertical direction on both of the right and left sides, and it is needless to say that the present invention is applicable also, for example, to the optical system for detecting focusing condition which has horizontal photo-detector arrays only at the center part and the optical system for detecting focusing condition having horizontal and vertical photo-detector arrays in a cross shape at the center part.

As described above, in the optical system for detecting focusing condition by phase difference method according to the present invention, a pair of image re-forming lenses are configured with plano-convex lenses having the same radius of curvature and the same axial thickness, and the radius of curvature and the axial thickness of the above-mentioned plano-convex lenses are made nearly equal, and an aperture mask provided with a pair of diaphragm apertures is attached closely to the flat surfaces of the plano-convex lenses, and therefore the centers of curvature of the image re-forming lenses do not deviate significantly from the surface of the aperture mask containing the diaphragm apertures, and accordingly, comatic aberrations of the image re-forming lens relative to the light fluxes incident from the directions symmetric with respect to the aperture center line of the diaphragm aperture corresponding to the aforesaid image re-forming lens become nearly the same degree, and the magnitudes of the image points for each incident light flux become nearly the same, and consequently the degree of identity of a pair of re-formed images is improved, and thereby a good effect is produced that a high accuracy in focusing condition detection can be obtained.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An optical system for detecting focusing condition comprising a plurality of combinations consisting of a pair of image re-forming lenses and an aperture mask, wherein said pair of image re-forming lenses are configured with a pair of plano-convex lenses having an equal radius of curvature R and an equal axial thickness T, and further fulfilling the condition of $0.8 \leq R/T \leq 1.1$, and wherein, said aperture mask has apertures corresponding to the respective plano-convex lenses.

2. An optical system for detecting focusing condition in accordance with claim 1, wherein all the plano-convex lenses have the equal radius of curvature and the equal axial thickness.

3. An optical system for detecting focusing condition in accordance with claim 1, wherein all the aperture masks are integrated with one another.

4. An optical system for detecting focusing condition in accordance with claim 1, wherein said pair of plano-convex lenses of each combinations are integrated with each other.

5. An optical system for detecting focusing condition in accordance with claim 4, wherein all the plano-convex lenses are integrated with one another.

6. An optical system for detecting focusing condition in accordance with claim 1, wherein the aperture center of each aperture formed in at least one of the aperture masks is eccentric with respect to the center of curvature of the plano-convex lens corresponding to said aperture.

7. An optical system for detecting focusing condition in accordance with claim 6, wherein the distance between the centers of curvature of the respective plano-convex lenses is larger than the distance between the aperture centers of the respective apertures formed in at least one of the aperture masks.

8. An optical system for detecting focusing condition in accordance with claim 6, wherein all the plano-convex lenses have the equal radius of curvature and the equal axial thickness.

9. An optical system for detecting focusing condition in accordance with claim 6, wherein all the aperture masks are integrated with one another.

10. An optical system for detecting focusing condition in accordance with claim 6, wherein said pair of plano-convex lenses of each combination are integrated with each other.

11. An optical system for detecting focusing condition in accordance with claim 10, wherein all the plano-convex lenses are integrated with one another.

* * * * *